United States Patent [19]

Hacker et al.

[11] 4,311,726
[45] Jan. 19, 1982

[54] METHOD FOR THE MANUFACTURE OF A HIGH-TENSILE STRENGTH OPTICAL WAVEGUIDE

[75] Inventors: Heinz Hacker, Nuremberg; Hubert Aulich, Munich; Josef Grabmaier, Berg; Nikolaos Douklias, Heimstetten, all of Fed. Rep. of Germany

[73] Assignee: Siemens Aktiengesellschaft, Munich, Fed. Rep. of Germany

[21] Appl. No.: 154,809

[22] Filed: May 30, 1980

[30] Foreign Application Priority Data

Jun. 29, 1979 [DE] Fed. Rep. of Germany ....... 2926415

[51] Int. Cl.³ .......................... B05D 3/06; B05D 5/06
[52] U.S. Cl. ..................................... 427/54.1; 65/3.12; 138/DIG. 2; 264/22; 350/96.12; 350/96.34; 427/163
[58] Field of Search ...................... 427/54.1, 386, 162, 427/165, 389.8, 389.7, 163; 264/1, 22; 138/DIG. 2; 162/156; 65/3 C, 60 B; 350/96.34, 96.12, 96.3, 96.1, 96.29; 528/110, 112, 361, 365

[56] References Cited

U.S. PATENT DOCUMENTS

| | | | |
|---|---|---|---|
| 3,367,992 | 2/1968 | Bearden | 528/112 X |
| 4,097,350 | 6/1978 | Pastor et al. | 427/54.1 X |
| 4,099,837 | 7/1978 | Vazirani | 350/96.29 |
| 4,125,644 | 11/1978 | Ketley et al. | 427/54.1 |

*Primary Examiner*—Michael R. Lusignan
*Assistant Examiner*—Thurman K. Page
*Attorney, Agent, or Firm*—Kenyon & Kenyon

[57] ABSTRACT

The invention relates to a method for manufacturing a hihg-tensile strength optical waveguide with a plastic layer of the epoxy-acrylate type located on the lightguide fiber, wherein a radiation-hardenable prepolymer is applied to the lightguide fiber immediately after the fiber-drawing process. The invention provides for the use in such a method of a preopolymer, which can be hardened by actinic radiation, of at least one acylated hydroxy ester of acrylic and/or methacrylic acid and an epoxide with $n \leq 3$ epoxide groups per molecule. The optical waveguides manufactured by the method according the present invention are suitable particularly for purposes of optical information transmission.

4 Claims, No Drawings

METHOD FOR THE MANUFACTURE OF A HIGH-TENSILE STRENGTH OPTICAL WAVEGUIDE

BACKGROUND OF THE INVENTION

The present invention relates to a method for the manufacture of a high-tensile strength optical waveguide having a plastic layer of the epoxy-acrylate type located on the lightguide fiber thereof through application of radiation-hardenable prepolymers to the lightguide fiber immediately following the fiber-drawing process.

Optical waveguides consist essentially of glass fibers which have an index-of-refraction profile such that incident light is guided in them, following all curves of the fibers. By reason of this property, these waveguides may serve as a transmission medium. However, the use of optical glass waveguides in communication systems, for example, for information transmission, requires consideration of two intrinsic problems; namely, realizing high strength inherent in the fiber itself and avoiding an increase in attenuation caused by micro-bending of the fiber.

To eliminate the problems mentioned, the lightguide fibers are typically coated with suitable plastic materials. Non-reactive coating materials have been utilized, such as polyvinylidene fluoride and polymethylsiloxane ("Siemens Forsch.-u. Entwickl.-Ber." Vol. 6, 1977, No. 5, pp. 314 to 319), polyesters, polyimides and polyester imides (German Offenlegungsschrift No. 27 29 648), as have reactive coating materials, such as epoxides and polyurethanes ("Siemens Forsch.-u. Entwickl. Ber." Vol. 7, 1978, No. 3, pp. 158 to 165).

Heretofore, application of the plastic coating for increasing the tensile strength and for protecting the surface of the glass from mechanical influences and damage, has preferably been performed by a varnishing technique, the plastic being applied from solution by means of a wick or a roll or by an immersion technique. The varnishing technique permits an application of only a few $\mu m$, i.e., of about 5 $\mu m$, of the coating in a technically satisfactory manner per step. However, experience shows that a layer applied directly to the lightguide fiber must have, on the average, a thickness of at least about 20 $\mu m$ in order to be effective. Accordingly, several successive, time-consuming coating operations are necessary with the varnishing technique to obtain layers which increase the tensile strength or offer effective mechanical protection.

Application from solutions further requires long drying sections and high drying temperatures in order to obtain acceptable production speeds, as well as elaborate apparatus for drawing-off the solvent vapors in order to prevent pollution of the environment. In addition, solvent occlusions are detrimental to the coating. It is also difficult, due to the surface tension conditions between the coating material and the substrate, to obtain uniform coating of the plastic on the fiber since the so-called "pearl-string" effect can only be reduced, but not prevented, if the coating material becomes temporarily of low viscosity when it enters the drying zone.

These same considerations and difficulties apply to coating with reactive, e.g., additively cross-linking, resin systems if they are applied from solutions; however, even solvent-free systems exhibit the pearl-string effect. A further aggravating circumstance in additively cross-linking systems is the lack of constant viscosity due to the fact that the components continue to react, especially in the coating device. Here again, uniform coating cannot be assured.

In addition, the speed-determining factors in production are the drying speed and the reaction rate of the coating materials as well as the thickness of the plastic layer. Raising the temperature in the drying zones as a means of shortening the drying time can only be practiced to a limited degree before adverse effect on the surface quality of the varnish layer results.

Plastic layers can also be produced by extrusion of a firmly adhering jacket directly on the fiber surface. This method, however, is often accompanied by additional attenuation due to micro bands. Coating from a hot melt remains limited to use of only a very few materials with low melt viscosity, and temperature control in the process is critical. Other possible coating methods, such as those which are based on the spraying technique, are not suitable because of the small size of the substrate, i.e., the lightguide fiber. Another possibility of coating lightguide fibers, discussed in the technical literature, is the electrostatic application of jacketing materials in powder form. This method, however, requires a fiber which either is itself electrically conductive or is made electrically conductive and with which, in addition, contact must be maintained during the coating process.

Besides these problems relating merely to the application of the coating, problems regarding the solidification of the material, once applied, also arise. Solidification, which is generally accomplished by evaporation of solvents or by a chemical cross-linking reaction, requires more technical means and requires extended periods of time. The time factor, however, obviously is important for an economical production process. In addition, there exist problems regarding the adhesion of the plastic to the glass surface of the fibers, good adhesion of the coating material being necessary to obtain high tensile strength. For this purpose, adhesion agents are, therefore, used. However, with direct application of an adhesion agent to the fiber surface, which is generally the most effective form of application, an additional operation is required. In addition, mechanical damage to the virgin glass surface, especially by the coating cuvette, may be encountered using such a procedure.

From U.S. Pat. No. 4,099,837, an optical waveguide is known, on the glass fiber of which is applied a polymer coating, of the polymerization product of a prepolymer mixture, for increasing the tensile strength, which prepolymer mixture is obtained through reaction of acrylic acid with a mixture of an aliphatic and an aromatic diglycidyl ether in the equilibrium ratio 0.4:1.0. The mixture also contains a UV-stabilizer for hardening the prepolymer with ultraviolet light. In addition, the coating material preferably also contains an adhesion agent of the silane or titanate type. In addition to the requirement for an adhesion agent, a distinct disadvantage in these known optical waveguides is that the plastic layer of the epoxy-acrylate type contains free epoxy groups, i.e., reactive groups, which not only can cause stickiness but is also objectionable from a toxological point of view.

SUMMARY OF THE INVENTION

It is an object of the present invention to develop a method for the manufacture of an optical waveguide using a prepolymer for coating, in a manner such that efficient production is made possible and danger to the environment is precluded. In particular, an optical waveguide is desired which exhibits high tensile strength without the need for an adhesion agent. In addition, it should be possible to apply the plastic layer in one operation and to harden it rapidly.

According to the invention, this objective is achieved by using as the prepolymer an adduct, which is hardenable by actinic radiation, of at least one acylated hydroxy ester of acrylic and/or methacrylic acid and an epoxide with $n \leq 3$ epoxide groups per molecule, where the adduct corresponds to the general formula I

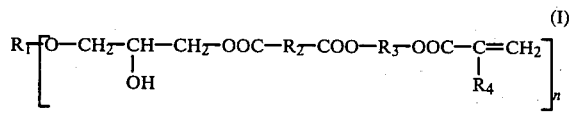

wherein
$R_1$ is the core or nucleus of an epoxide with n epoxide groups;
$R_2$ is the core or nucleus of an aliphatic, cycloaliphatic or aromatic dicarboxylic acid;
$R_3$ is an aliphatic or cycloaliphatic radical with 2 to 12 carbon atoms;
$R_4$ is a hydrogen atom or a methyl group; and
n is an integral number between 1 and 3.

"Core" or "nucleus" of an eppxide is understood in the context of the present invention to be an organic structure which carries at least one

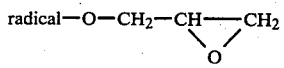

or at least one epoxide function in the form of a cyclohexane oxide grouping. Within the scope of the present invention, the "core" or "nucleus" of dicarboxylic acid is an aliphatic, cycloaliphatic or aromatic structure which carries two carboxyl groups (—COOH). The aliphatic core $R_2$ may be saturated or unsaturated and branched or unbranched; a cycloaliphatic core may be saturated or unsaturated. The radical $R_3$ may likewise be of a saturated or unsaturated cycloaliphatic, or saturated or unsaturated, branched or unbranched aliphatic nature.

The prepolymers used in the method according to the invention are prepared, for example, as follows:

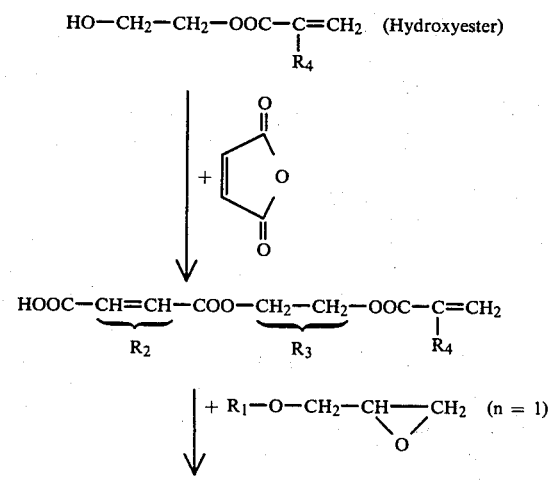

-continued

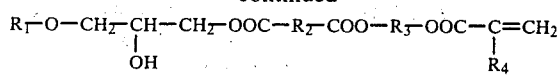

The optical waveguide produced by the method according to the present invention has the following advantages:

(1) The coating can be applied in a single operation, as a so-called thick-film application, to the lightguide fiber (20 to 50 μm per operation).

(2) The coating does not continue to react chemically at room temperature, i.e., its viscosity remains constant.

(3) The coating material can set rapidly, so that high production speeds are obtained.

(4) The plastic layer adheres firmly to the lightguide fiber of glass without the need for an adhesion agent.

(5) The tensile strength is increased over that of known optical waveguides.

(6) The optical waveguide can be subjected temporarily to temperatures of over 250° C. in subsequent extrusion processes.

The mentioned advantages are obtained due to the facts that the lightguide fiber is coated with the prepolymer, in a form without solvent, immediately following the fiber-drawing process, for example, by means of a coating cuvette, and the physical, mechanical and thermal properties of the prepolymers can be varied within wide limits by means of a predetermined chemical structure. In particular, the following properties can be influenced:

(a) The viscosity of the prepolymers, which is the determining factor for the layer thickness which can be obtained per operation. This property can be influenced both by means of temperature and by the choice of the chemical building blocks of the prepolymers;

(b) the mechanical properties of the coating material may likewise be set via the chemical building blocks from which the prepolymers are built up, and the interfering influence of radial pressure forces on the attenuation of the optical waveguide can also be prevented;

(c) the number of polar groups (in the form of ester and hydroxyl groups) per polymer unit, which are the determining factor for the adhesion of the coating to the glass surface (the adhesion being based on strong physical interactions); and (d) the type and number of the chemical groupings which can be cross-linked by actinic radiation extremely rapidly and which, thereby, determine the degree of cross-linking and thus the mechanical and thermal properties and the surface quality of the coating material as well as the uniform thickness of the coating (preventing the occurrence of the pearl-string effect).

Due to the width of variation possible in the prepolymers used in the method according to this invention, it is also possible to apply to the plastic layer strongly adhering coatings of such prepolymers as so-called "cushion" or "buffer" layers. For this purpose, prepolymers with a lower module of elasticity are used, which result in a soft buffer layer which adheres well to the mechanically strong plastic layer due to the similar chemical structure. To the buffer layer can then further be applied, if required, a thermoplastic protective tube, for example, by the tube-stretching process.

In the method according to the invention, the setting or cross-linking of the prepolymers takes place by means of actinic, i.e., photochemically effective, radiation. Preferably, UV-radiation is utilized. It is important that the UV-setting takes place at low temperatures. The sensitizing for cross-linking initiated by UV-light is generally accomplished through the addition of about 1% by weight of a sensitizer, for example, benzoine isopropyl ether.

In the method according to the present invention, 1:1 adducts of acrylic and/or methacrylic acid and acrylic and/or methacrylic acid glycidyl ester can advantageously be added to the prepolymers. The viscosity of the prepolymers can likewise be adjusted by means of such adducts with represent quasi-reactive thinners. The prepolymes used themselves are generally of low to medium viscosity (10 to 300,000 cP or mPa.s) at room temperature. Due to the general structure schematic, it is also possible, however, to utilize in the method according to the invention prepolymers which are solid at room temperature. Such prepolymers have the advantage that they have a low melting viscosity and are, therefore, suitable for extrusion coating.

In general, it should further be pointed out that with the method according to the invention, a viscosity optimum for cuvette coating can be adjusted (prevention of the pearl-string effect). In addition, coatings with small thickness variations can be produced with this method through simple temperature control of the coating device.

The feature that the solid state can be used differentiates the prepolymers used in the method according to this invention from the prepolymers known from U.S. Pat. No. 4,099,837. In addition, these prepolymers also have no free epoxide groups. It is further advantageous in the method according to the invention that, in principle, no adhesion agent is necessary and that it is possible to adjust to an optimum viscosity.

DESCRIPTION OF THE INVENTION

The invention is explained in greater detail with the aid of the following examples.

EXAMPLE I

Preparation of a Viscous Prepolymer

To 650.4 parts by weight 2-hydroxyethylmethacrylate are added 490.3 parts by weight maleic acid anhydride, 5.7 parts by weight 4,4'-N,N'-dimethylaminodiphenyl methane (T-base) and 0.2 parts by weight hydroquinone. After stirring for 12 days at room temperature (22° C.), a slightly greenish liquid (acid number: 251) is obtained.

503.1 parts by weight of the acylated 2-hydroxyethylmethacrylic acid ester are introduced at a temperature of 60° to 65° C. into 391.5 parts by weight bisphenol-A-bisglycidyl ether (epoxide number: 0.559) within an hour while stirring continuously. The reaction is catalyzed by the addition of 1 part by weight T-base. After a reaction time of 80 to 100 hours, a slightly yellowish-colored, honey-like prepolymer with a viscosity ($\eta_{20}$) of 230,000 cP is obtained.

EXAMPLE II

Preparation of a Solid Prepolymer 297 parts by weight triglycidylisocyanurate (epoxy number: 1.01) are melted while stirring at 130° C. and 1.5 parts by weight 4,4'-methylene-bis-(N,N-dimethylaniline) and 0.2 parts by weight hydroquinone are added. After the melt has cooled down to 110° C., 684 parts by weight of the acylated 2-hydroxyethylmethacrylic acid ester (acid number: 251) prepared according to Example I are added dropwise within an hour while stirring continuously. During this time, the reaction temperature is lowered to 80° to 85° C. and is held at this temperature for about 3 hours. In this process, a resin solid at room temperature with a residual acid number of about 4 and a residual epoxy number of 0.006 is obtained, which is suitable for coating from the melt.

In conclusion, it should be pointed out that in the method according to this invention, the cross-linking also can be accomplished by radical initiation instead of with actinic radiation. However, thick-film application is not then possible. The optical waveguides produced by the method according to the invention are suitable particularly for purposes of optical information transmission.

What is claimed is:

1. In a method for the manufacture of a high-tensile strength optical waveguide with a plastic layer of the epoxideacrylate type located on the lightguide fiber through application of a radiation-hardenable prepolymer to the lightguide fiber immediately after the fiber-drawing process, the improvement comprising utilizing as said prepolymer an adduct, hardenable by actinic radiation, of at least one acylated hydroxy ester of acrylic and/or methacrylic acid and an epoxide with $n \leq 3$ epoxide groups per molecule, said adduct corresponding to the general formula:

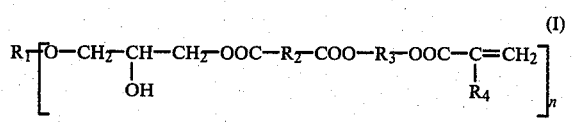

where
- $R_1$ denotes the core of an epoxide with n epoxide groups;
- $R_2$ is the core of an aliphatic, cycloaliphatic or aromatic dicarboxylic acid;
- $R_3$ is an aliphatic or cycloaliphatic radical with 1 to 12 C-atoms;
- $R_4$ is a hydrogen atom or a methyl group; and
- n is an integral number between 1 and 3.

2. The method according to claim 1 wherein said adduct is hardened by UV-radiation.

3. The method according to claim 1 wherein said adduct is mixed with at least one 1:1 adduct of acrylic and/or methacrylic acid and acrylic- and/or methacrylic acid glycidyl ester.

4. The method according to claim 1 wherein said prepolymer is prepared by the method consisting of reacting a hydroxyalkyl or hydroxycycloalkyl ester of acrylic and/or methacrylic acid with a compound selected from the group consisting of aliphatic, cycloaliphatic and aromatic dicarboxylic acid anhydride and thereafter reacting the resultant reaction product with an epoxide.

* * * * *